C. E. & A. W. KRAUSE.
NUT LOCK.
APPLICATION FILED SEPT. 2, 1916.
1,256,141.
Patented Feb. 12, 1918.
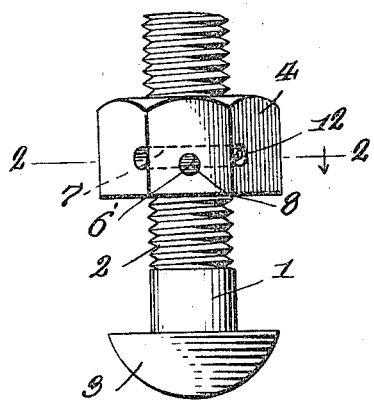
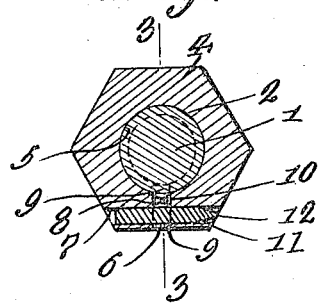
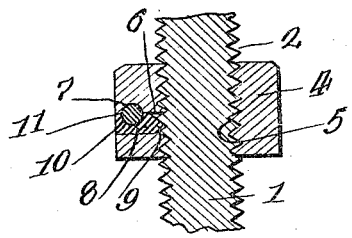
WITNESSES
Guy M. Spring
Wm. Webster Downing
INVENTOR
Charles E. Krause
Albert W. Krause
BY
ATTORNEY

UNITED STATES PATENT OFFICE.

CHARLES E. KRAUSE AND ALBERT W. KRAUSE, OF HARTFORD, CONNECTICUT.

NUT-LOCK.

1,256,141.     Specification of Letters Patent.     Patented Feb. 12, 1918.

Application filed September 2, 1916.   Serial No. 118,261.

*To all whom it may concern:*

Be it known that we, CHARLES E. KRAUSE and ALBERT W. KRAUSE, citizens of the United States, residing at Hartford, in the county of Hartford and State of Connecticut, have invented certain new and useful Improvements in Nut-Locks, of which the following is a specification.

This invention relates to nut locks and has for its principal aim and object to provide a nut with novel means whereby the nut will be locked in various adjusted positions on the bolt.

It is an equal important object of the present invention to provide novel means arranged in the nut for releasably holding the locking means in position to prevent accidental displacement thereof.

Briefly, the invention consists of a nut provided with openings for receiving a bolt engaging pin having a tapered end so that it will clutch the threads of the bolt and also another pin or key for removably engaging the bolt engaging pin to prevent accidental displacement thereof.

Among the other aims and objects of the invention may be recited the provision of a device of the character mentioned with a view to simplicity, the number of parts of which are few, the cost of production low and the efficiency high.

Other objects, as well as the nature, characteristic features and scope of my invention will be readily apparent from the accompanying drawings, taken in connection with the following description and pointed out in the claims forming a part of this specification.

The invention is clearly illustrated in the accompanying drawings in which:—

Figure 1 is a front elevation of my invention.

Fig. 2 is a section taken on the line 2—2 of Fig. 1 in the direction of which the arrow points.

Fig. 3 is a vertical section of my invention taken on line 3—3 of Fig. 2.

Fig. 4 is an enlarged perspective detail of the bolt locking or clutch pin and,

Fig. 5 is an enlarged perspective of the retaining pin.

Similar characters of reference are employed in all of the above described views, to indicate corresponding parts.

Referring now, more particularly, to the several figures of the said drawings we provide a bolt 1 the outer end of which is threaded as indicated by the numeral 2 while a head 3 is formed on the opposite end thereof. This bolt may be of any conventional type and a nut 4 is adjustably and removably mounted thereon through the medium of a threaded opening 5.

In order to effectively lock the nut in various desired positions on the bolt we have provided the nut with an opening 6 which extends transversely through the nut and at right angles to the longitudinal axis of the bolt communicating with the threaded opening 5 for a purpose that will presently appear. The nut is further provided with another transversely extending opening 7 which is arranged to intersect the opening 6. It is to be noted however that the lower edge of the opening 7 lies in a plane midway the upper and lower edges of the openings 6 for a purpose which will also presently appear. A bolt engaging pin 8 has the inner edge tapered to a point as indicated by the numeral 9 so that when this pin is inserted in the opening 6 the tapered edge 9 will clutch the threads 2 on the bolt. The pin 8 is also provided with a transverse recess 10 which when the pin is inserted in the opening 6, is arranged to register with the opening 7. To prevent the accidental displacement of the locking pin 8 we have provided a retaining pin 11 one end of which is tapered to a point as indicated by the numeral 12. It will be apparent that when the pin 11 is inserted in the opening 7 that it will engage the recess 10 in the pin 8 and prevent longitudinal and rotary movement thereof consequently holding the locking pin in a locked position.

The mode of operation of the invention may be reviewed as follows:—

The nut being adjusted to the desired position on the bolt, the locking pin 8 is inserted in the opening 6 in the nut so that the pointed end 9 will bite or clutch the threads of the bolt whereupon the pin 11 is guided by the pointed end 12 through the opening 7 so as to engage the recess 10 and prevent accidental rotary or longitudinal movement of the pin 8, thereby effectively locking the nut on the bolt.

Although we have shown and described a preferred embodiment of our invention we desire it to be understood that we are not to be limited to the exact details shown. However, we desire that a special emphasis be laid upon the bolt locking pin and the retaining pin coöperating therewith.

While we have illustrated and described a preferred embodiment of the invention, we are aware that many modifications may be made therein by any person skilled in the art without departing from the scope of the invention as expressed in the claims. Therefore, we do not wish to be limited to all the details shown, but What we do claim is:—

1. The combination of the threaded end of a bolt, a nut removably and adjustably mounted thereon and having passages therein, one of said passages extending radially, and another passage connecting with and extending at right angles to the first passage, a round pin having an obliquely cut end adapted for insertion in the radial passage, the faces of which end meet and form a sharp edge adapted to engage with the threads at their roots, said pin being further provided with a groove, formed transversely, and with a tapered end adapted for insertion in the second named passage for engagement with the groove in the first pin for retaining said first pin in the radial passage and in locking engagement with the threads to prevent a movement of the nut.

2. A nut lock comprising a nut and a threaded bolt, said nut being provided with a passage that extends radially therethrough, a second passage extending at right angles to and partially intersecting said first passage, a pin for said first passage, said pin being provided with a semi-circular groove in one side and a wedge-shaped end, a round pin for the second passage to coöperate with the groove of the first pin to removably hold said latter pin in position so that its wedge end will engage with the threads of the bolt.

In testimony whereof we affix our signatures in presence of two witnesses.

CHARLES E. KRAUSE.
ALBERT W. KRAUSE.

Witnesses:
PATRICK J. SULLIVAN,
Mrs. P. J. SULLIVAN.

Copies of this patent may be obtained for five cents each, by addressing the "Commissioner of Patents, Washington, D. C."